(12) United States Patent
Sanyal et al.

(10) Patent No.: US 12,291,358 B2
(45) Date of Patent: May 6, 2025

(54) INTEGRATED GUIDANCE AND FEEDBACK CONTROL FOR AUTONOMOUS VEHICLE

(71) Applicants: Amit K. Sanyal, Manlius, NY (US); Sasi Prabhakaran Viswanathan, Syracuse, NY (US)

(72) Inventors: Amit K. Sanyal, Manlius, NY (US); Sasi Prabhakaran Viswanathan, Syracuse, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 1050 days.

(21) Appl. No.: 16/646,682

(22) PCT Filed: Sep. 15, 2017

(86) PCT No.: PCT/US2017/051754
§ 371 (c)(1),
(2) Date: Mar. 12, 2020

(87) PCT Pub. No.: WO2019/055025
PCT Pub. Date: Mar. 21, 2019

(65) Prior Publication Data
US 2020/0277053 A1    Sep. 3, 2020

(51) Int. Cl.
*B64U 10/00*     (2023.01)
*B64U 10/14*     (2023.01)
*G05D 1/00*      (2006.01)

(52) U.S. Cl.
CPC ........... *B64U 10/14* (2023.01); *G05D 1/0858* (2013.01); *B64U 2201/10* (2023.01)

(58) Field of Classification Search
CPC .... G05D 1/0825; G05D 1/0808; G05D 1/101; G05D 1/0858; G05D 1/102; B64C 39/024; B64U 50/13; B64U 2201/10
See application file for complete search history.

(56) References Cited

U.S. PATENT DOCUMENTS

| | | |
|---|---|---|
| 6,611,737 B1 | 8/2003 | El-Tahan et al. |
| 7,289,906 B2 | 10/2007 | van der Merwe et al. |

(Continued)

FOREIGN PATENT DOCUMENTS

| | | | |
|---|---|---|---|
| CN | 103149937 A | * | 6/2013 |
| EP | 1901153 A1 | | 3/2008 |

(Continued)

OTHER PUBLICATIONS

Ru et al. "Nonlinear Model Predictive Control for Unmanned Aerial Vehicles" In: AIAA Guidance, | 1-14 Navigation, and Control Conference, Aerospace 2017, Jun. 17, 2017 [Online], [retrieved on Nov. 16, 2017 (Nov. 16, 2017)} Retrieved from the Internet <URL: http:/Avww.mdpi.com/2226-4310/4/2/31 (Year: 2017).*

(Continued)

*Primary Examiner* — Anne Marie Antonucci
*Assistant Examiner* — Jordan T Smith
(74) *Attorney, Agent, or Firm* — David L. Nocilly; Bond, Schoeneck & King PLLC

(57) ABSTRACT

An integrated guidance and feedback control scheme for steering an underactuated vehicle through desired waypoints in three-dimensional space. The guidance and control algorithm takes as an input the desired trajectory for the translational motion that passes through the given waypoints, and autonomously generates the desired trajectory for the attitude based on the desired thrust direction to achieve the translational motion trajectory. A feedback control law is obtained to steer the underactuated vehicle towards the desired trajectories in translation and rotation.

16 Claims, 11 Drawing Sheets

(56) References Cited

U.S. PATENT DOCUMENTS

| | | | |
|---|---|---|---|
| 8,260,479 | B2 | 9/2012 | Christenson et al. |
| 8,447,443 | B1 | 5/2013 | Ryan et al. |
| 8,543,265 | B2 | 9/2013 | Ekhaguere et al. |
| 9,250,630 | B2 | 2/2016 | Downey et al. |
| 9,286,810 | B2 | 3/2016 | Eade et al. |
| 2009/0248304 | A1 | 10/2009 | Roumeliotis et al. |
| 2014/0188774 | A1 | 7/2014 | George |
| 2015/0304634 | A1 | 10/2015 | Karvounis |
| 2016/0070265 | A1 | 3/2016 | Liu et al. |
| 2016/0140729 | A1 | 5/2016 | Soatto et al. |
| 2017/0153650 | A1* | 6/2017 | Chang .............. B64C 39/024 |
| 2017/0193830 | A1* | 7/2017 | Fragoso ............. G08G 5/55 |
| 2017/0212529 | A1* | 7/2017 | Kumar ............... G01C 21/20 |

FOREIGN PATENT DOCUMENTS

| | | | |
|---|---|---|---|
| WO | 2015105597 | A2 | 7/2015 |
| WO | 2016033796 | A1 | 3/2016 |

OTHER PUBLICATIONS

Viswanathan et al. "Integrated Guidance and Feedback Control of Underactuated Vehicles in SE(3)" In: Conference: AIAA Guidance, Navigation, and Control Conference, Jan. 2017. (Year: 2017).*

Lee, Taeyoung & Leok, Melvin & Mcclamroch, N.H .. (2011). Geometric Tracking Control of a Quadrotor UAV on SE(3). 5420-5425. 10.1109/CDC.2010.5717652. (Year: 2011).*

Machine translation of CN103149937A (Year: 2013).*

X.-N. Shi, Y.-A. Zhang and D. Zhou, "Adaptive geometric trajectory tracking control of quadrotor with finite-time convergence," 2014 IEEE International Conference on Robotics and Biomimetics (ROBIO 2014), Bali, Indonesia, 2014, pp. 2541-2546, doi: 10.1109/ROBIO.2014.7090723. (Year: 2014).*

Dynamic interpolation and application to flight control Joseph W. Jackson and Peter E. Crouch Journal of Guidance, Control, and Dynamics 1991 14:4, 814-822 (Year: 1991).*

B. Tian, L. Liu, H. Lu, Z. Zuo, Q. Zong and Y. Zhang, "Multivariable Finite Time Attitude Control for Quadrotor UAV: Theory and Experimentation," in IEEE Transactions on Industrial Electronics, vol. 65, No. 3, pp. 2567-2577, Mar. 2018, doi: 10.1109/TIE.2017.2739700. (Year: 2017).*

Takeshi Yamasaki, Hirotoshi Sakaida, Keisuke Enomoto, Hiroyuki Takano and Yoriaki Baba, "Robust trajectory-tracking method for UAV guidance using proportional navigation," 2007 International Conference on Control, Automation and Systems, Seoul, Korea (South), 2007, pp. 1404-1409. (Year: 2007).*

X.-N. Shi, Y.-A. Zhang and D. Zhou, "Almost-Global Finite-Time Trajectory Tracking Control for Quadrotors in the Exponential Coordinates," in IEEE Transactions on Aerospace and Electronic Systems, vol. 53, No. 1, pp. 91-100, Feb. 2017, doi: 10.1109/TAES.2017.2649258. (Year: 2017).*

A. Roza and M. Maggiore, "Position control for a class of vehicles in SE(3)," 2012 IEEE 51st IEEE Conference on Decision and Control (CDC), Maui, HI, USA, 2012, pp. 5631-5636, doi: 10.1109/CDC.2012.6425982. (Year: 2012).*

S. Salazar, I. González-Hernández, R. Lopez and R. Lozano, "Simulation and robust trajectory-tracking for a Quadrotor UAV," 2014 International Conference on Unmanned Aircraft Systems (ICUAS), Orlando, FL, USA, 2014, pp. 1167-1174, doi: 10.1109/ICUAS.2014.6842371. (Year: 2014).*

P. De Monte and B. Lohmann, "Trajectory tracking control for a quadrotor helicopter based on backstepping using a decoupling quaternion parametrization," 21st Mediterranean Conference on Control and Automation, Platanias, Greece, 2013, pp. 507-512, doi: 10.1109/MED.2013.6608769. (Year: 2013).*

Simha, Ashutosh et al. "A Geometric Approach to Rotor Failure Tolerant Trajectory Tracking Control Design for a Quadrotor." arXiv: Optimization and Control (2017): n. pag. (Year: 2017).*

* cited by examiner (a) Attitude tracking error function (b) Angular velocity error, ω

(a) Position tracking error (b) Velocity tracking error (c) Norm of position tracking error (a) Magnitude of total thrust (b) Control Torque

INTEGRATED GUIDANCE AND FEEDBACK CONTROL FOR AUTONOMOUS VEHICLE

CROSS-REFERENCE TO RELATED APPLICATIONS

This application is a national stage application under 35 U.S.C. § 371 of International Patent Application No. PCT/US2017/051754, filed Sep. 15, 2017, hereby incorporated by reference in its entirety.

BACKGROUND OF THE INVENTION

1. Field of the Invention

The present invention relates to unmanned vehicles and, more specifically, to guidance control having nonlinear stability as well as autonomous attitude control for improved robustness.

2. Description of the Related Art

Autonomous operation of an unmanned vehicle is considered an important topic of current research interest for several applications where remote human piloting is not feasible, such as security, agriculture and aquaculture, inspection of civilian infrastructure, space and underwater exploration, wildlife tracking and conservation, package delivery, and remote sensing. A critical aspect of reliable operations of unmanned vehicles is that of nonlinearly stable autonomous guidance and control with a large domain of attraction for robustness to external disturbances. This is particularly true for beyond visual-line-of-sight (BVLOS) operations that require safety and reliability in the presence of disturbances such as wind. The absence of nonlinear stability in such a situation may lead to failure and a crash of the vehicle. In addition, the attitude dynamics of the underactuated unmanned vehicle need to be controlled simultaneously with its translational dynamics. Accordingly, there is a need in the art for an approach to unmanned vehicle navigation that provides nonlinear stability as well as autonomous attitude control for improved robustness and that is discretized in time for easy computerized integration.

BRIEF SUMMARY OF THE INVENTION

The present invention is a control system for an underactuated vehicle having a plurality of thrusters that provide a body-fixed thrust direction. The control system provides improved robustness and is discretized in time for easy computerized integration. The system includes a controller operably interconnected to the plurality of thrusters for selectively controlling each of the plurality of thrusters and the controller is programmed to receive a position trajectory describing a flight path for the vehicle from a starting position to at least one waypoint, to determine a thrust vector needed to track the position trajectory, to determine a thrust direction that is transverse to the thrust vector, to determine an attitude trajectory to track the position trajectory from the thrust vector and thrust direction, and to determine a control torque for the vehicle that provides the thrust vector and the attitude trajectory needed to track the position trajectory. The controller is further programmed to selectively operate the plurality of thrusters of the vehicle according to the control thrust and control torque. The controller is further programmed to determine a current position, an attitude, a translational velocity, and an angular velocity of the vehicle after operating the plurality of thrusters. The controller is also programmed to repeat the determination of the thrust vector, the thrust direction, the attitude trajectory, the control torque, the operation of the thrusters, and the determination of the current position, attitude, translational velocity and angular velocity according to discrete time intervals. The controller is also programmed to determine the thrust vector that tracks the position trajectory by geometric control that guarantees nonlinear stability. The attitude trajectory tracks the position trajectory from the desired thrust vector direction and the thrust direction attitude trajectory guarantees nonlinear stability. The controller is programmed to determine a control torque for the vehicle that provides the thrust vector and the attitude trajectory that tracks the received position trajectory.

The present invention also comprises a method of controlling an underactuated vehicle having a plurality of thrusters that guarantees nonlinear stability. The steps of the method include receiving a position trajectory on the vehicle, wherein the position trajectory describes a flight path for the vehicle from a starting position to at least one waypoint, using a controller positioned on the vehicle and operably interconnected to the plurality of thrusters to determine a thrust vector that tracks the position trajectory, using the controller on the vehicle to determine a thrust direction that is transverse to the thrust vector, using the controller on the vehicle to determine an attitude trajectory that tracks the received position trajectory, and using the controller on the vehicle to determine a control torque for the vehicle that provides the thrust vector and the attitude trajectory that tracks the received position trajectory. The method further comprises the step of selectively operating the thrusters of the vehicle according to the control torque. The method also includes the step of determining the current position, attitude, and velocity of the vehicle after operating the thrusters. The method may also involve repeating the determination of the thrust vector, the thrust direction, the attitude trajectory, the control torque, the operation of the thrusters, and the determination of the current position, attitude, and velocity according to discrete time intervals. The step of determining the thrust vector that tracks the position trajectory is performed by geometric control that guarantees nonlinear stability. The step of determining the attitude trajectory to track the received position trajectory is performed by geometric control that guarantees nonlinear stability. The step of determining the control torque for the vehicle that provides the thrust vector and the attitude trajectory that tracks the received position trajectory is performed by finite-time stable attitude control.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
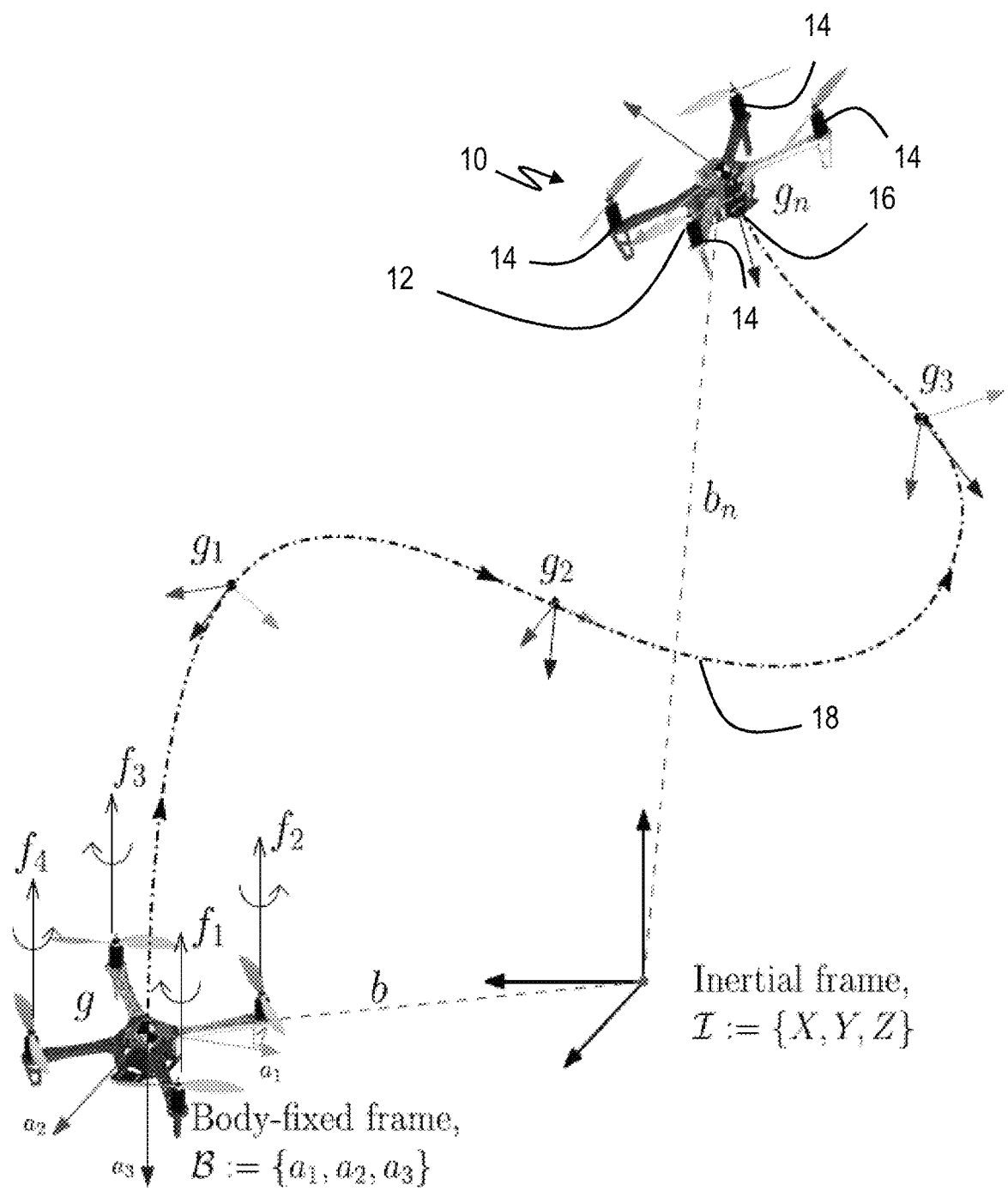
FIG. 1 is a schematic of an exemplary underactuated vehicle to be guided through a set of waypoints according to the present invention.

Referring to the figures, wherein like numerals refer to like parts throughout, there is seen in FIG. 1 an underactuated vehicle 10 that is to be guided through a set of finite waypoint $g_1, g_2, g_3 \ldots g_n$. For the purposes of demonstrating the present invention, vehicle 10 is shown and described as having a fixed-body frame 12 having four actuators 14 that produce thrust vectors $f_1, f_2, f_3, f_4$ that are separated by a scalar distance D from the axis of rotation to the center of vehicle 10, an arrangement conventionally referred to as a quadcopter or small unmanned aerial vehicle (sUAV). Vehicle 10 includes a microcontroller 16 that controls thrust actuators 14 to follow a predetermined position trajectory 18 that described the intended flight path of vehicle 10 and can be prepared off-board and sent to microcontroller 16 or calculated directly on-board microcontroller 16 if desired. The present invention determines and implements the control of vehicle 10 so that executes the position trajectory 18.

The present invention is thus an integrated guidance and feedback control scheme for steering an underactuated vehicle through desired waypoints in three-dimensional space. The underactuated vehicle is modeled as a rigid body with four control inputs. These control inputs actuate the three degrees of freedom of rotational motion and one degree of freedom of translational motion in a vehicle body-fixed coordinate frame. This actuation model is appropriate for a wide range of underactuated vehicles, including spacecraft with internal attitude actuators, vertical take-off and landing (VTOL) aircraft, fixed-wing multirotor unmanned aerial vehicles (UAVs), maneuverable robotic vehicles, etc. The guidance problem is developed on the special Euclidean group of rigid body motions, SE(3), in the framework of geometric mechanics, which represents the vehicle dynamics globally on this configuration manifold. The integrated guidance and control algorithm takes as an input the desired trajectory for the translational motion that passes through the given waypoints, and the desired trajectory for the attitude is generated autonomously based on the desired thrust direction to achieve the translational motion trajectory. A feedback control law is then obtained to steer the underactuated vehicle towards the desired trajectories in translation and rotation. This integrated guidance and control scheme takes into account known bounds on control inputs and generates a trajectory that is continuous and at least twice differentiable, which can be implemented with continuous and bounded control inputs. In an example, the integrated guidance and feedback control scheme is applied to an underactuated quadcopter UAV to autonomously generate a trajectory through a series of given waypoints in SE(3) and track the desired trajectory in finite time. The overall stability analysis of the feedback system is addressed. Discrete time models for the dynamics and control schemes of the UAV are obtained in the form of Lie group variational integrators using the discrete Lagrange-d'Alembert principle. Almost global asymptotic stability of the feedback system over its state space is shown analytically and verified through numerical simulations.

Guidance Scheme

Coordinate Frame Definition

The configuration of an unmanned vehicle modeled as a rigid body is given by its position and orientation, which are together referred to as its pose. To define the pose of the vehicle, a coordinate frame β is fixed to its body and another coordinate frame $\mathcal{I}$ that is fixed in space and takes the role of an inertial coordinate frame. Let $b \in \mathbb{R}^3$ denote the position vector of the origin of frame β with respect to frame $\mathcal{I}$ represented in frame $\mathcal{I}$. Let R∈ denote the orientation, defined as the rotation matrix from frame β to frame $\mathcal{I}$. The pose of the vehicle can be represented in matrix form as follows:

$$g = \begin{bmatrix} R & b \\ 0 & 1 \end{bmatrix} \in SE(3), \tag{1}$$

where SE(3) is the six-dimensional Lie group of rigid body motions (translational and rotational) that is obtained as the semi-direct product of $\mathbb{R}^3$ with SO(3).

Trajectory Generation for Unmanned Vehicle

The trajectory generation problem consists of creating an appropriately smooth trajectory through a given finite set of desired waypoints which the underactuated vehicle's trajectory is required to pass through. These waypoints are given in the inertial frame $\mathcal{I}$ as follows:

$$b_{d_1}, b_{d_2}, \ldots, b_{d_n} \in \mathbb{R}^3, \text{ with } b_{d_i} = b_d(t_i) |^3 \text{ and } t_1 < t_2 < \ldots < t_n. \tag{1}$$

Here $b_d(t)$ gives the desired position trajectory on $\mathbb{R}^3$ parameterized by time. A time trajectory for the position that is continuous and twice differentiable (i.e., $b_d(t) = {}^2(^3)$) could be generated, for example, using interpolating functions between the waypoints. A time trajectory for the position can also be generated using standard linear quadratic control schemes, and this approach may generate smooth trajectories between waypoints. Once the desired position trajectory over time has been generated based on the given waypoints, one needs to generate a desired attitude trajectory such that the position trajectory is achieved. The procedure by which this is done utilizes the known actuation and the dynamics model, and is detailed in the following section.

Let $g_d(f) \in SE(3)$ be the desired pose (position, $b_d$ and attitude, $R_d$) generated by the guidance scheme. Then the desired velocities (translational, $v_d$ and rotational, $\Omega_d$) are given by $\xi_d(t)$ that satisfies the kinematics $$\dot{g}_d(t) = g_d(t) \xi_d(t)^\vee, \tag{2}$$

where $g_d(t) = R_d b_d 01$, $\xi_d = \Omega_d v_d \in {}^6$ and $\xi_d^\vee = \Omega_d^\vee v_d 0\, 0 \in \mathbb{C}^{4 \times 4}$.

Here $(\cdot)^v = \{\Omega^x v 00 \in |\Omega, v \in \mathbb{R}^3\}$, is a vector space isomorphism from $\mathbb{R}^6$ to the associated Lie algebra, and $(\cdot)^x: \mathbb{R}^3 \to \subset \mathbb{R}^{3\times 3}$ is the skew-symmetric cross-product operator that gives the vector space isomorphism between $\mathbb{R}^3$ and so(3):

$$x^\times = \begin{bmatrix} x_1 \\ x_2 \\ x_3 \end{bmatrix}^\times = \begin{bmatrix} 0 & -x_3 & x_2 \\ x_3 & 0 & -x_1 \\ -x_2 & x_1 & 0 \end{bmatrix}. \tag{4}$$

In addition to the desired waypoints, the vehicle has to satisfy its known dynamics. Consider the "nominal" model of the dynamics for the underactuated vehicle as given by $$\mathbb{I}\dot{\xi} = ad_\xi^* \mathbb{I}\xi + \varphi(g,\xi) + Bu, \; u \in \mathcal{C} \subset \mathbb{R}^4, B \in \mathbb{R}^{6\times 4}, \tag{5}$$

where $\mathbb{I}$ denotes the mass (m) and inertia (J) properties of the vehicle given as $$\mathbb{I} = \begin{bmatrix} J & 0 \\ 0 & mI_3 \end{bmatrix} \in \mathbb{R}^{6\times 6} \tag{6}$$

and $I_3$ is the 3×3 identity matrix.

The vector of known (modeled) moments and forces is denoted $\varphi(g,\xi) \in \mathbb{R}^6$; usually this is obtained from a known model. Note that the vehicle has four inputs for the six degrees of freedom of translational and rotational motion, as given by the control influence matrix B, which can be expressed in block matrix form as follows:

$$B = \begin{bmatrix} I_4 \\ 0_{2\times 4} \end{bmatrix},$$

where $I_4$ is the 4×4 identity matrix. The adjoint operator on se(3) and the co-adjoint operator $(ad_\xi)$ are defined in matrix form as $$ad_\xi = \begin{bmatrix} -\Omega^\times & 0 \\ -v^\times & -\Omega^\times \end{bmatrix} \text{ and } ad_\xi^* = (ad_\xi)^T, \tag{7}$$

where $\Omega, v \in \mathbb{R}^3$ denote the rotational and translational velocities of the underactuated vehicle, respectively, in frame β. The vector of control inputs $u \in \mathcal{C} \subset \mathbb{R}^4$ has to be in the set of admissible controls C and directly actuates the three degrees of rotational motion and one degree of translational motion. This actuation model is applicable to aerial, space and underwater vehicles and it is known that a rigid body is controllable with such actuation Feedback Guidance and Tracking on TSE(3)

The desired trajectory is generated in SE(3) and the tracking errors are expressed with respect to inertial and body fixed frames as follows,

| | |
|---|---|
| $\tilde{b} := b - b_d$ | Position tracking error in inertial frame |
| $x := R_d^T \tilde{b}$ | Position tracking error in body fixed frame |
| $\tilde{v} := v - v_d = \dot{\tilde{b}}$ | Velocity tracking error in inertial frame |
| $Q := R_d^T R$ | Attitude tracking error |
| $\omega := \Omega - Q^T \Omega_d$ | Angular velocity tracking error |

Tracking Errors Expressed in Body Frame

Tracking errors on TSE(3) are defined as follows:

$$g = \begin{bmatrix} R & b \\ 0 & 1 \end{bmatrix}, g_d = \begin{bmatrix} R_d & b_d \\ 0 & 1 \end{bmatrix}. \tag{8}$$

Tracking error on SE(3):

$$h = g_d^{-1} g = \begin{bmatrix} Q & x \\ 0 & 1 \end{bmatrix}, \tag{9}$$

where $Q = R_d^T R$ and $x = R_d^T(b - b_d) = R_d^T \tilde{b}$. Therefore, the kinematics for the pose tracking error is:

$$\dot{h} = h\xi^v, \tag{10}$$

where $$\xi^v = \begin{bmatrix} \omega^\times & v \\ 0 & 0 \end{bmatrix}, \tag{11}$$

and $\omega = \Omega - Q\Omega_d, v = v - Q(v_d + \Omega_d^\times x)$. The dynamics for the tracking errors in velocities is:

$$m\dot{v} = -fe_3 + m\{\omega^\times Qv_d - Q(\dot{v}_d + \Omega_d^\times x + \Omega_d^\times Qv)\} + \tag{12}$$
$$m(v + Qv_d)^\times (\omega + Q\Omega_d) + mgQR_d e_3,$$

$$J\dot{\omega} = \tau + J(\omega^\times Q\Omega_d - Q\dot{\Omega}_d) - (\omega + Q\Omega_d)^\times J(\omega + Q\Omega_d). \tag{13}$$

Translational Motion Control in Inertial Frame

Because the desired position trajectory, $b_d(t)$, is generated in the inertial frame $\mathcal{I}$, it is convenient to express the position and translational velocity tracking error dynamics (12) in this frame. As the translational dynamics is expressed in the inertial frame, the rotational dynamics is decoupled from the translational dynamics such that the translation control force is obtained in the inertial frame followed by the appropriate attitude control in body-fixed frame to track the desired trajectory, $b_d$. Note that $v = Rv$ and $Qv_d = RR_d^T v_d = Rv_d$, where $v_d = R_d v_d = \dot{b}_d$. Define $\tilde{b} := b - b_d$ and $\tilde{v} := v - v_d = \dot{\tilde{b}}$. Therefore, in inertial frame $\mathcal{I}$, the position and translational velocity tracking error dynamics are:

$$\dot{\tilde{b}} = \tilde{v} = v - v_d, \; m\dot{\tilde{v}} = mge_3 - fr_3 + m\dot{v}_d, \tag{14}$$

where $r_3 = Re_3$ is the third column vector of the rotation matrix R from frame β to frame $\mathcal{I}$, which represents the true attitude of the body. Here $e_1 = [1\;0\;0]$ $e_2 = [0\;1\;0]$ and $e_3 = [0\;0\;1]$, are the standard basis vectors (as column vectors) of $\mathbb{R}^3$. Note that $fr_3 = -\overline{\varphi}_c$ can be considered as the control force vector acting on the body, expressed in inertial frame. The magnitude of this vector is one of the control inputs f, which is designed as a feedback control law. The direction of this vector $r_3 = Re_3$ is designed as part of the desired trajectory for the attitude in SO(3), with the other two column vectors of the rotation matrix R obtained from the generated trajectory for $r_3$. This feedback guidance plus trajectory tracking control is detailed in the following development.

Consider the following Lyapunov function for the desired translational motion:

$$V_{tr}(\tilde{b}, \tilde{v}) = \tfrac{1}{2} m\tilde{v}^T \tilde{v} + \tfrac{1}{2} \tilde{b}^T P\tilde{b}, \tag{15}$$

where $P \in 3 \times 3$ is a positive definite control gain matrix. Therefore, along the translational error dynamics (3.2), $$\dot{V}_{tr} = m\tilde{v}\dot{\tilde{v}} + \tilde{b}P\dot{\tilde{b}} = \tilde{v}(m\dot{\tilde{v}} + P\tilde{b}) = \tilde{v}(mge_3 - fr_3 - m\dot{v}_d + P\tilde{b}). \quad (16)$$

It is desired that the control force vector satisfies:

$$fr_3 = \overline{\varphi}_c = mge_3 + P\tilde{b} + L_v\tilde{v} - m\dot{v}_d, \quad (17)$$

where $L_v \in 3 \times 3$ is another positive definite control gain matrix. Therefore, the control law for the magnitude of this force vector is:

$$f = e_3^T R_T \overline{\varphi}_c = e_3^T R_T (mge_3 + P\tilde{b} + L_v(Rv - v_d) - m\dot{v}_d). \quad (18)$$

However, to achieve stable tracking of the desired translational motion, the attitude has to be controlled such that the direction of $Re_3 = r_3$ agrees with that specified by (17). This is done in the following subsection.

Generating Desired Attitude Trajectory

Given the desired control force vector in inertial frame as given by (17), one can generate a desired trajectory for the third column of $R_d$ (the desired attitude) as follows:

$$r_{3d} = \frac{mge_3 + P\tilde{b} + L_v\tilde{v} - m\dot{v}_d}{\|mge_3 + P\tilde{b} + L_v\tilde{v} - m\dot{v}_d\|} = R_d e_3. \quad (19)$$

Select an appropriate $s_d(t) \in \mathbb{S}^2(\mathbb{R}^3)$ such that it is transverse to $r_{3d}$. Now compute $$r_{2d} = \frac{r_{3d} \times s_d}{\|r_{3d} \times s_d\|} = R_d e_2, \quad (20)$$

and $$r_{1d} = r_{2d} \times r_{3d} = R_d e_1.$$

The desired attitude trajectory is then given by:

$$R_d = [r_{2d} \times r_{3d}, r_{2d}, r_{3d}] \in. \quad (21)$$

Few methods to select $s_d(t)$ appropriately is described in the following results.

If $s_d$ is selected as $$s_d = 1 \times r_{3d} + \mu e_1, \text{ with } \mu > 3, \quad (22)$$

then $s_d$ is always transverse and never parallel to $r_{3d}$.
Proof.

The condition on $\mu$ in (22) comes from the following observation:

$$r_{3d} \times s_d = r_{3d} \times (1 \times r_{3d} + \mu e_1) \quad (23)$$

$$= (r_{3d} r_{3d})1 - (r_{3d} 1)r_{3d} + \mu r_{3d} \times e_1$$

$$= 1 - (r_{3d} 1)r_{3d} + \mu r_{3d} \times e_1,$$

because $r_{3d} \in \mathbb{S}^2$, i.e., it is a unit vector. Define $\rho(r_{3d}) = 1 - (r_{3d} 1)r_{3d}$ so that:

$$r_{3d} \times s_d = \rho(r_{3d}) + \mu r_{3d} \times e_1. \quad (24)$$

It can be verified that the components of the vector $\rho(r_{3d})$ are bounded in the closed interval $[-4/3, 0]$. Therefore, the first component of the vector $r_{3d} \times s_d$ is bounded in the closed interval $[\mu - 4/3, \mu]$. If $\mu > 3$, then this component is always positive, and therefore $r_{3d} \times s_d \neq 0$. Therefore, the choice of $s_d$ given in (19) ensures that it is always transverse to the generated $r_{3d}$.

The following statement gives a simpler choice of $s_d$ in $\mathbb{R}^3$ that is transverse to $r_{3d} \in \mathbb{S}^3$. It also gives a vector that is orthogonal to the given unit vector.

Let $r_{3d} = a_1 a_2 a_3 \in \mathbb{S}^2 \subset \mathbb{R}^3$ be a known unit vector as given in (16). The vector $s\_d = a\_2 + a\_3$ $$s_d = \begin{bmatrix} a_2 + a_3 \\ a_3 - a_1 \\ -a_1 - a_2 \end{bmatrix} \quad (25)$$

is orthogonal to $r_{3d}$.
Proof.

This is easily verified by the property of scalar product (orthogonal projection) as follows:

$$r_{3d} s_d = a_1(a_2 + a_3) + a_2(a_3 - a_1) + a_3(-a_1 - a_2)$$

$$= a_1(a_2 + a_3 - a_2 - a_3) + a_2(a_3 - a_3) = 0.$$

This shows that the vector $s_d$ as defined by (25) is orthogonal to the given vector $r_{3d}$.

As the next step, a control torque is selected such that $R \to R_d$ in finite time; this is done using an attitude tracking control scheme outlined in the next section.

Feedback Tracking Control Schemes

It is known that finite-time stability is more robust to external disturbances to the dynamics than asymptotic or exponential stability. Having a finite-time stable attitude control scheme also theoretically guarantees that the overall combined feedback attitude and position tracking control scheme is asymptotically stable, unlike conventional schemes which only guarantee convergence and not stability. This is because the desired thrust direction required for the position control is achieved in finite time, as shown in the second part of this section. The first part of this section details the attitude tracking control scheme and its stability properties, while the second part gives the stability result for the entire (translational and rotational) motion control scheme.

Finite-Time Stable Attitude Tracking Control on TSO(3)

Here we provide a finite-time stable attitude control scheme that is continuous and can be implemented with actuators commonly used for unmanned vehicles like rotorcraft and fixed-wing UAVs. The following two lemmas are used to prove the main result. Let a and b be non-negative real numbers and let $p \in (1,2)$. Then $$a^{(1/p)} + b^{(1/p)} \geq (a+b)^{(1/p)}. \quad (26)$$

This inequality is strict if both a and b are non-zero. This above inequality holds for all $p > 1$ as $f(x) = x^{(1/p)}$ is a concave function and therefore subadditive. For the finite-time attitude tracking scheme, only the case where $p \in (1,2)$ is required.

Let $K = (k_1, k_2, k_3)$, where $k_1 > k_2 > k_3 \geq 1$. Define $$s_K(Q) = \sum_{i=1}^{3} k_i(Qe_i) \times e_i, \quad (27)$$

such that $t-K, I-Q=\omega s_K(Q)$. Here $A, B=(AB)$, which makes $K, I-Q$ a Morse function defined on. Let $\subset$ be a closed subset containing the identity in its interior, defined by $$S = \{Q \in : Q_{ii} \geq 0 \text{ and } Q_{ij}Q_{ji} \leq 0 \quad (28)$$
$$\forall i, j \in \{1, 2, 3\}, i \neq j\}.$$

Then for $Q \in S$, we have $$s_K(Q)^T s_K(Q) \geq tr(K-KQ). \quad (29)$$

The finite-time attitude tracking control scheme and its proof of stability are given as follows. Note that this control scheme is continuous (indeed smooth) in time. This is unlike sliding mode control schemes that cannot be implemented with actuators (like rotors) that can only provide continuous control inputs.

Consider the attitude dynamics of Eq. (13) with $s_K(Q)$ as defined in (24). Define $$z_K(Q) = \frac{s_K(Q)}{(s_K(Q)s_K(Q))^{1-1/p}}, \text{ and} \quad (30)$$

$$w(Q, w) = \frac{}{T} s_K(Q) = \sum_{i=1}^{3} k_i e_i \times (\omega \times Q e_i), \quad (31)$$

where P is as defined in Lemma 4.1. Further, let $L_\Omega$ be a positive definite control gain matrix such that $L_\Omega - J$ is positive semidefinite, let $k_p > 1$ and define $\kappa$ such that $$\kappa^p = \frac{\sigma_{L,min}}{\sigma_{J,max}} > 0.$$

Consider the feedback control law for $\tau$ given by $$\tau = J\left(Q\dot{\Omega}_d - \frac{\kappa H(s_K(Q))}{(s_K(Q)s_K(Q))^{1-1/p}} w(Q, \omega)\right) + \quad (32)$$
$$(Q\Omega_d)^{\times} J(Q\Omega_d - \kappa z_K(Q)) + \kappa J(z_K(Q) \times Q\Omega_d) +$$
$$\kappa J(\omega + Q\Omega_d) \times z_K(Q) - k_p s_K(Q) - \frac{L_\Omega \Psi(Q, \omega)}{(\Psi(Q, \omega) L_\Omega \Psi(Q, \omega))^{1-1/p}},$$

where $$\Psi(Q, \omega) = \omega + \kappa z_K(Q), \quad (33)$$

and $H(x) = I - \frac{2(1-1/p)}{xx} xx.$ (34)

Then the feedback attitude tracking error dynamics given by (13) is stabilized to $(Q, \omega) = (I, 0)$ in finite time.
Proof.

Consider $\omega = -\kappa z_K(Q)$ and define the Morse-Lyapunov function $K, I-Q$ on $SO(3)$. Then the time derivative of this Morse-Lyapunov function along the attitude kinematics is given by $$\frac{}{T} K, I-Q = \omega s_K(Q) = -\kappa s_K(Q) z_K(Q) = \quad (35)$$
$$-\kappa \frac{s_K(Q) s_K(Q)}{(s_K(Q)s_K(Q))^{1-1/p}} = -\kappa (s_K(Q)s_K(Q))^{1/p} \leq -\kappa (K, I-Q)^{1/p},$$

where we employed inequality (26) in Lemma 1. Therefore, when $\Psi(Q,\omega)=0$, one can conclude that $K, I-Q \to 0$ in finite time for all initial Q in the subset $\subset$ defined in Lemma 4.1, which yields $Q \to I$ in finite time once $Q \in$.

The control law is then designed to ensure that $\Psi(Q,\omega) \to 0$ in finite time. Consider the Lyapunov function $$V_{rot}(Q,\omega) = k_p K, I-Q + \omega(Q,\omega) J \Psi(Q,\omega), \quad (36)$$

for the attitude dynamics of (13) with control law (32). The time derivative of this Lyapunov function along this feedback dynamics is given by $$\dot{V}_{rot} = k_p \omega s_K(Q) + \Psi(Q, \omega) J \Psi(Q, \omega) = \quad (37)$$
$$k_p \omega s_K(Q) + \Psi \left[\tau_c + J\Omega \times (Q\Omega_d - \kappa z_K(Q)) + \right.$$
$$J(\omega^\times Q\Omega_d - Q\dot{\Omega}_d) + \frac{\kappa J H(s_K(Q))}{(s_K(Q)s_K(Q))^{1-1/p}} w(Q, \omega)\right]$$

After substituting the control law (32) into the expression (37) and carrying out several algebraic simplifications, one obtains $$\dot{V}_{rot} = -k_p \kappa (s_K(Q)s_K(Q))^{1/p} - (\Psi(Q,\omega)L_\Omega \Psi(Q,\omega))^{1/p} \leq -\kappa (k_p K, I-Q)^{1/p} - \kappa (\Psi(Q,\omega) J \Psi(Q,\omega))^{1/p},$$

for $(Q,\omega) \in x^3$, where $\subset$ is as defined in (28). After substituting inequality (26) into the above expression, one obtains $$\dot{V}_{rot} \leq -\kappa (k_p K, I-Q + \Psi(Q, \omega) J \Psi(Q, \omega))^{1/p} = -\kappa V_{rot}^{1/p}, \quad (38)$$

which implies that the feedback attitude tracking control system is (locally) finite-time stable at $(Q,\omega)=(I,0)$.

Note that the domain of attraction shown in the above analysis is $(Q,\omega) \in x^3$. The rest of the proof to show almost global finite-time stability of the attitude feedback control is identical to conventional proofs in the art, and is omitted here for the sake of brevity.

Stability of the Overall Feedback System on TSE(3)

The following statement outlines the stability of the overall feedback system with the control laws (32) and (18). The overall feedback control system given by the tracking error kinematics (10) and dynamics (13)-(14) is asymptotically stable for the generated state trajectory $(b_d(t), R_d(t), v_d(t), \Omega_d(t)) \subset$. Moreover, the domain of convergence is almost global over the state space.
Proof.

This attitude tracking control scheme given by Theorem 4.1 ensures that $R(t)=R_d(t)$ for time $t \geq T$ where $T > 0$ is finite. Therefore, one obtains $r_3 = Re_3 = r_{3d}$ for $t \geq T$, and from (18) and (19), $$f = mge_3 + P\tilde{b} + L\tilde{v} - m\dot{v}_d, \text{ and}$$

$$fr_3 = fr_{3d} = mge_3 + P\tilde{b} + L_v \tilde{v} - m\dot{v}_d \text{ for } t \geq T. \quad (39)$$

Substituting (39) in (16) gives:

$$\dot{V}_{tr} = \tilde{v}(mge_3 - fr_{3d} - m\dot{v}_d + P\tilde{b}) \quad (40)$$
$$= -\tilde{v} L_v \tilde{v} \leq 0.$$

Since $L_v$ is positive definite, $\dot{V}_{tr}=0$ if and only if $\tilde{v}=0$. Applying LaSalle's invariance principle, one can show that when $\tilde{v}=0$, $m\dot{\tilde{v}}=mge_3-fr_{3d}+m\dot{v}_d=0$, and therefore $P\tilde{b}=0$, and thus $\tilde{b}=0$. Therefore, the tracking errors for the translational motion converge to $(\tilde{b},\tilde{v})=(0,0)$ Note that the finite-time stability of the attitude control scheme guarantees that the desired thrust direction, $r_{3d}$, is achieved in finite time. This in turn ensures that the desired position trajectory is asymptotically tracked and the overall attitude and position tracking control system is asymptotically stable. The almost global domain of convergence also provides robustness to disturbances. Moreover, the continuous control schemes give here can be implemented with rotorcraft UAV that have actuators that can only provide continuous control forces and torques.

EXAMPLE

Application to Autonomous UAV Navigation

For underactuated vehicle 10 seen in FIG. 1, the continuous equations of motion of the quadcopter UAV may be written as:

$$\dot{R}=R\Omega^\times, \quad (41)$$

$$m\dot{v}=mgRe_3-fe_3, \quad (42)$$

$$J\dot{\Omega}=J\Omega\times\Omega+\tau \quad (43)$$

Each propeller can generate a thrust $f_i$ proportional to the square of the corresponding motor speed i.e., $f_i=k_f\overline{\omega}_i^2$, and the torque generated by each actuator is directly proportional to its thrust i.e., $\tau_i=k_\tau\overline{\omega}_i^2$. The first and second axes ($a^1$ and $a_2$) of the body-fixed frame $\mathcal{I}$ lie in the plane normal to the axes of the propellers. The total thrust, $f=\Sigma_{i=1}^4 f_i$ acts along the third axis $-a_3$ of the body-fixed frame $\mathcal{I}$. For such an UAV as shown in FIG. 1, the control input vector $u=f\tau$ can be expressed in terms of the actuator speeds $\overline{\omega}_i$ according to $$u = \overline{\omega}_1^2\overline{\omega}_2^2\overline{\omega}_3^2\overline{\omega}_4^2, \text{ where}$$

$$= -k_f - k_f - k_f - k_f 0 - k_f D0k_f Dk_f D0 - k_f D0 - k_\tau k_\tau - k_\tau k_\tau \in \mathbb{R}^{4\times 4}$$

is a constant invertible matrix for $k_f\neq 0$ and $k_\tau\neq 0$. Then, $$\begin{bmatrix}\overline{\omega}_1^2\\\overline{\omega}_2^2\\\overline{\omega}_3^2\\\overline{\omega}_4^2\end{bmatrix} = K^{-1}\begin{bmatrix}f\\\tau\end{bmatrix} \quad (44)$$

Guidance Algorithm

The objective of the integrated trajectory generation and control is to navigate the UAV from an initial pose to a final desired pose in SE(3), through a finite set of desired waypoints. Pseudocode of the integrated guidance and feedback control algorithm that generates a trajectory that passes through the waypoints and satisfies the kinematics and dynamics is given below:

```
PSEUDO CODE
Integrated Guidance and Feedback Control
procedure IGFC b_d,f,R_d,τ b_d and f are in 𝓘
    set 𝓘
    Fix the inertial frame b = b_x b_y b_z
    Initialize the UAV with respect to an inertial frame 𝓘
    Select b_{d_1},b_{d_2},...,b_{d_f} select desired waypoints in R^3
    Generate b_d(t) = C^2(ℝ^3)
    Generate a smooth trajectory as a function of time in
    while t > t_0 do f ← (18)
    Compute the UAV control thrust in 𝓘 r_3d ← (19)
    desired thrust vector direction in the inertial frame
        for s_d(t)∈^2 (R^3) do s_d ãr_{3d} r_{2d} ← (20)
        end for
        R_d ← r_{2d} × r_{3d} r_{2d} r_{3d}
    Generate the desired attitude trajectory τ ← (32)
    Compute attitude control torque such that R(t) → R_d(t) in finite time
    end while
    return (b,R,v)
Implement the integrated guidance and feedback control on TSE(3)
with feedback of (b,R,v) and knowledge of (b_d,v_d,v̇_d,R_d,Ω_d,Ω̇_d)
end procedure
```

Numerical Validation

Discretization of the UAV Dynamics

The continuous equations of motion are discretized in the form of Lie Group Variational Integrator (LGVI) for digital implementation by applying the discrete Lagrange-d'Alembert principle. The LGVI preserves the structure of the configuration space, which in this case is the Lie group SE(3), without any reprojection or parameterization. The LGVI schemes also have good energy-momentum properties when the dynamical model is that of a conservative or nearly conservative system. The discrete model obtained for the present invention is a Lie group variational integrator.

Let $h\neq 0$ denote the fixed time step size, such that $h=t_{k+1}-t_k$. Then the discretized equations of motion obtained in the form of LGVI as, $$R_{k+1} = R_k F_k, \quad (45)$$

$$b_{k+1} = hR_k v_k + b_k,$$

$$mv_{k+1} = mF_k v_k + hmgR_{k+1}e_3 - hf_k e_3,$$

$$\Omega^\times_{d_{k+1}} = \frac{1}{h}\log(R_{d_k}^\top R_{d_{k+1}}),$$

$$J\Omega_{k+1} = F_k J\Omega_k + h\tau_k,$$

where $f_k \approx \exp(h\Omega_k^\times)\in SO(3)$ guarantees that $R_k$ evolves on SO(3).

The integrated guidance and feedback control scheme is numerically simulated for an UAV quadcopter of mass, m=4.34 kg; J=diag 0.8200.08450.1377 kgm². The helical desired trajectory and the initial conditions are given as follows $$b_d(t)=0.4 \sin(\pi t)0.6 \cos(\pi t)0.4t,$$

$$b(0)=100,$$

$$R(0)=I,$$

$$v(0)=000; \dot{v}(0)=000 \text{ and } \Omega(0)=000.$$

The numerical simulation is performed for five seconds, t=5 with a time step size of h=0.01, using the LGVI routine given in (54) for the choice of $s_d$ as given in proposition 3.3. The results of the numerical simulation are summarized in FIG. 10. The attitude error function Φ is parameterized as principle rotation angle, in terms of Q as given by, $$\Phi = \cos^{-1}(\tfrac{1}{2}(tr(Q)-1)).$$

The numerical results are obtained after selecting the following gain values:

$$P = 38 \times I^{3 \times 3}; L_v = 25 \times I^{3 \times 3}$$

$$L_\Omega = 3.5 \times I^{3 \times 3}; p = 0.75; \kappa = 0.04 \text{ and } k_p = 4.5.$$

These gain values were selected after trial and error, and provide desirable transient response characteristics of the overall control scheme.

Figure 2:
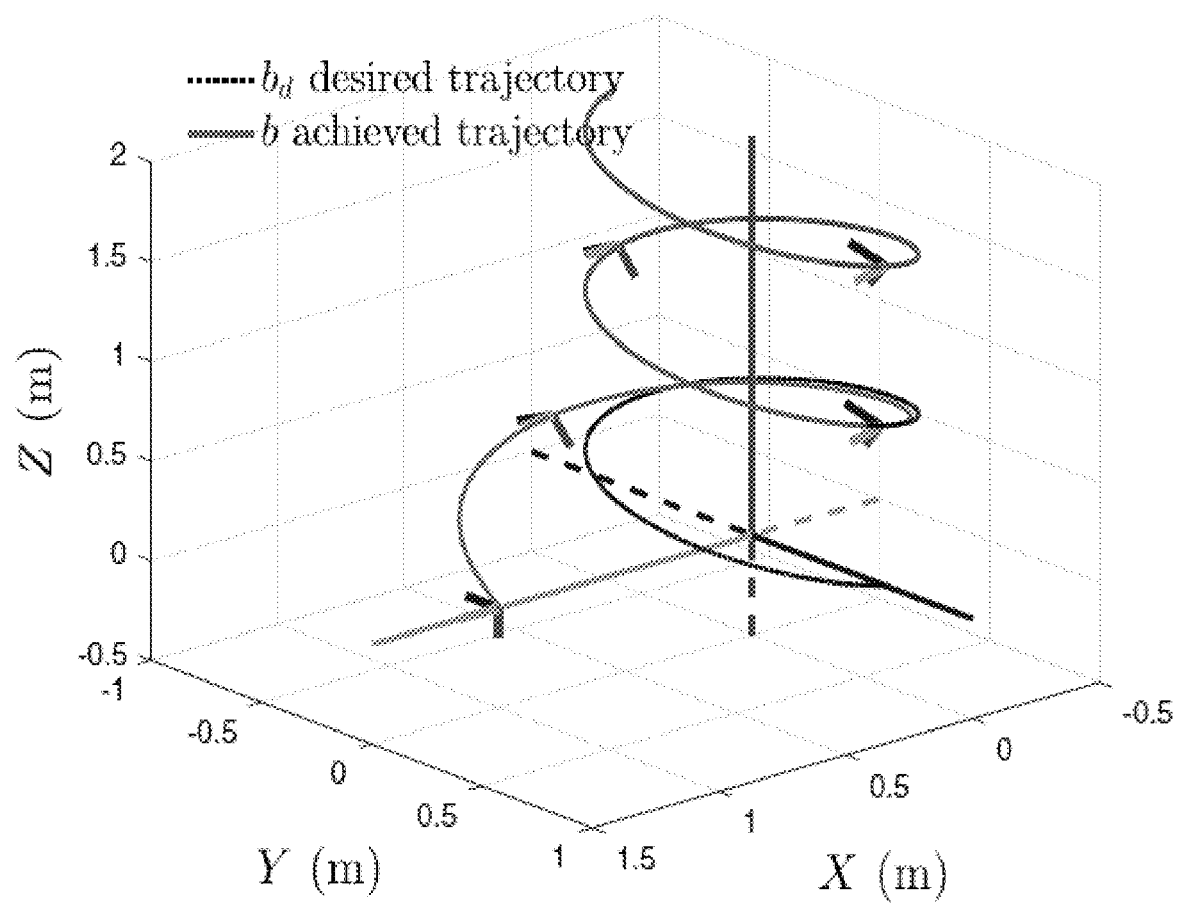
FIG. 2 is a graph of the desired and achieved trajectories of an underactuated vehicle guided through a set of waypoints according to the present invention.
Figure 3:
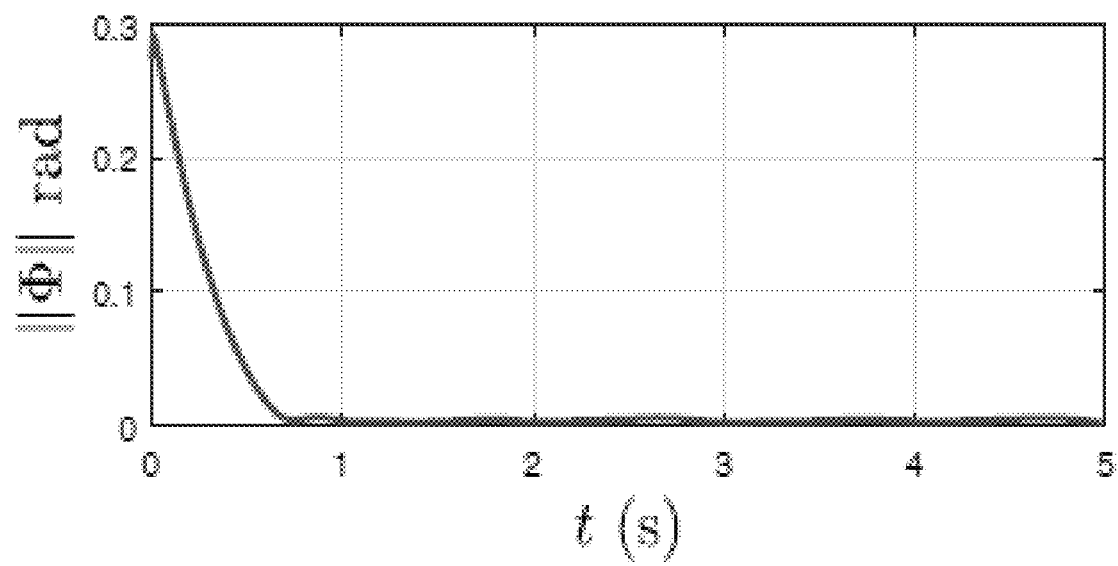
FIG. 3 is a graph of the attitude tracking error function according to the present invention.
Figure 4:
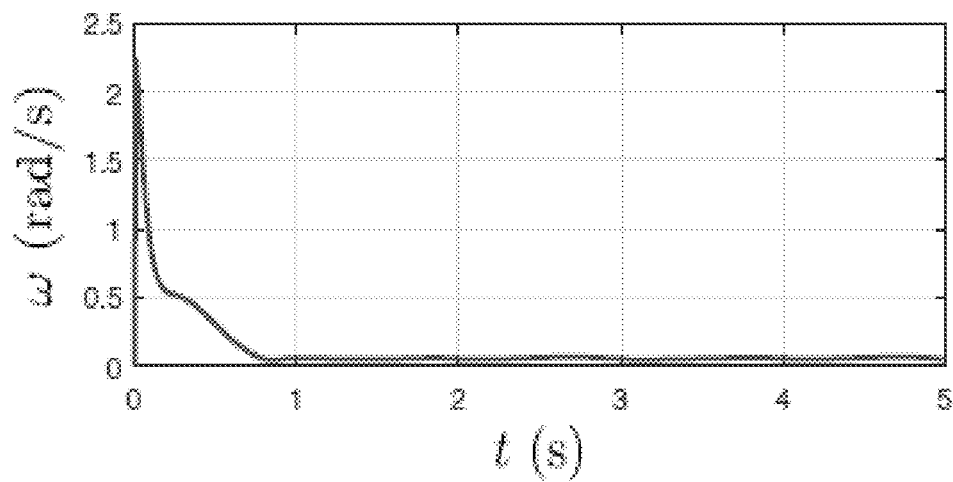
FIG. 4 is a graph of the angular velocity error according to the present invention.
Figure 5:
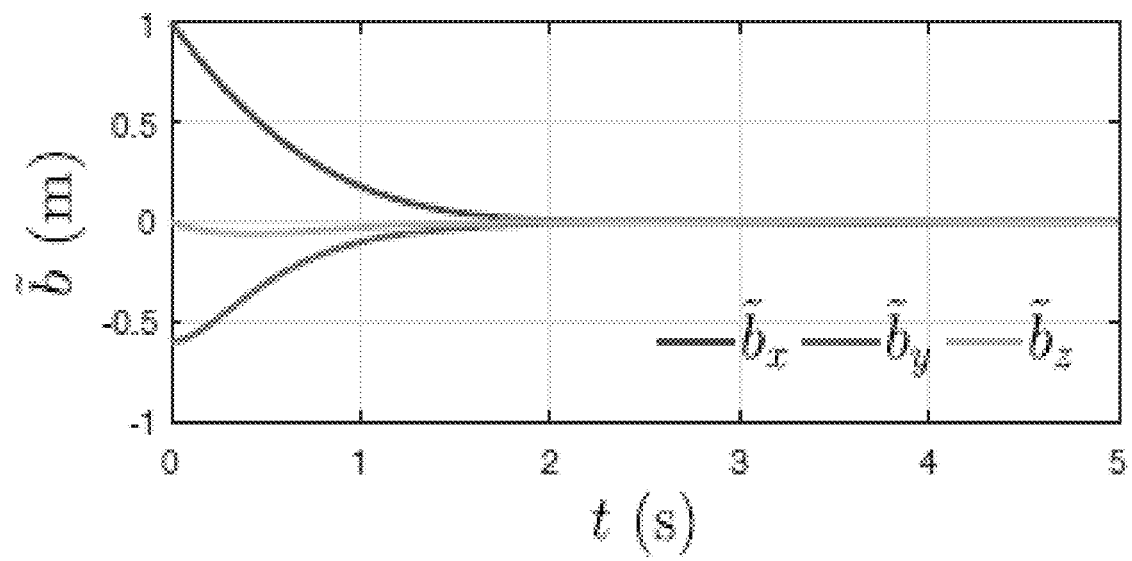
FIG. 5 is a graph of the position tracking error according to the present invention.
Figure 6:
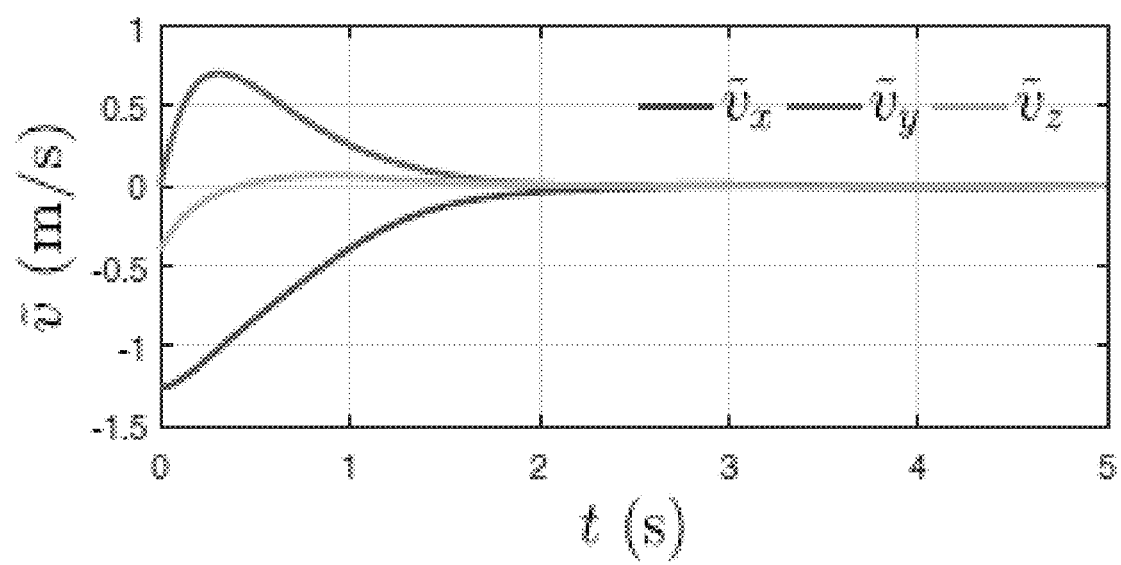
FIG. 6 is a graph of the velocity tracking error function according to the present invention.
Figure 7:
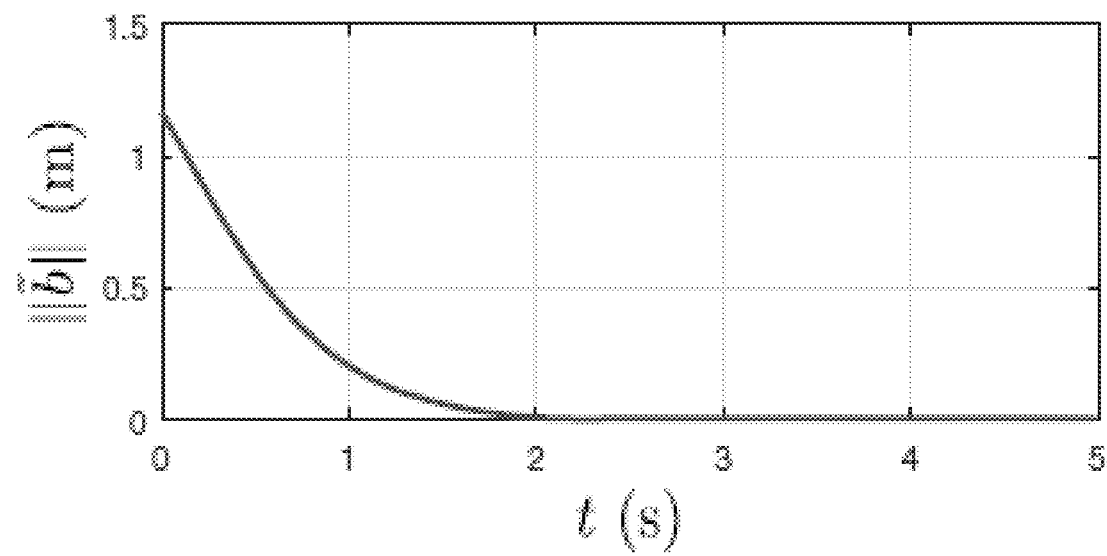
FIG. 7 is a graph of the norm of position tracking error according to the present invention.
Figure 8:
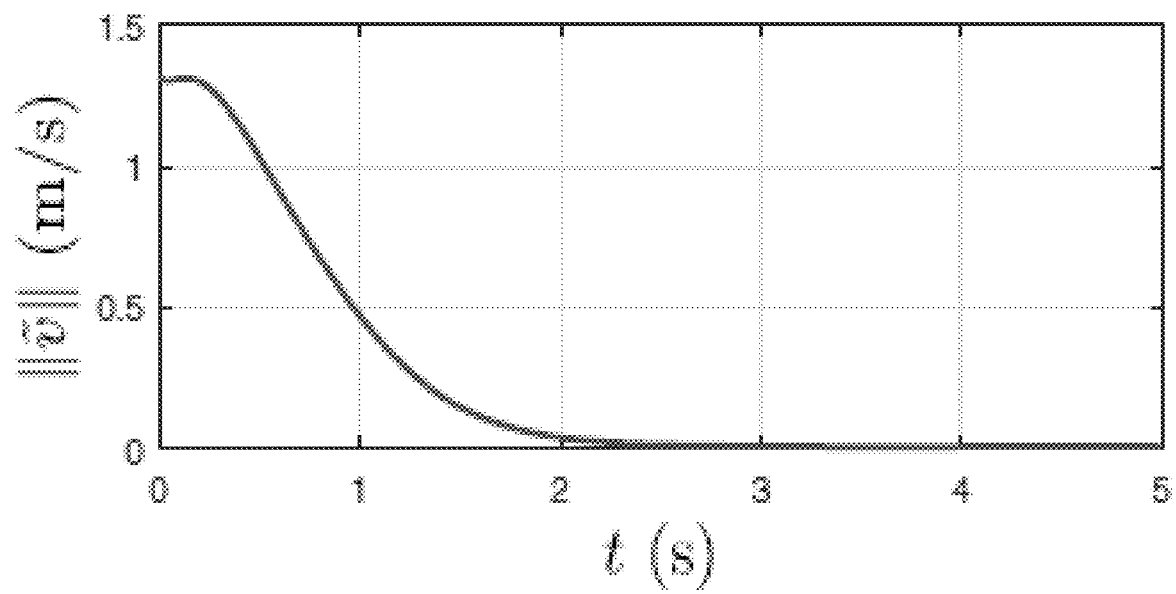
FIG. 8 is a graph of the norm of velocity tracking error according to the present invention.
Figure 9:
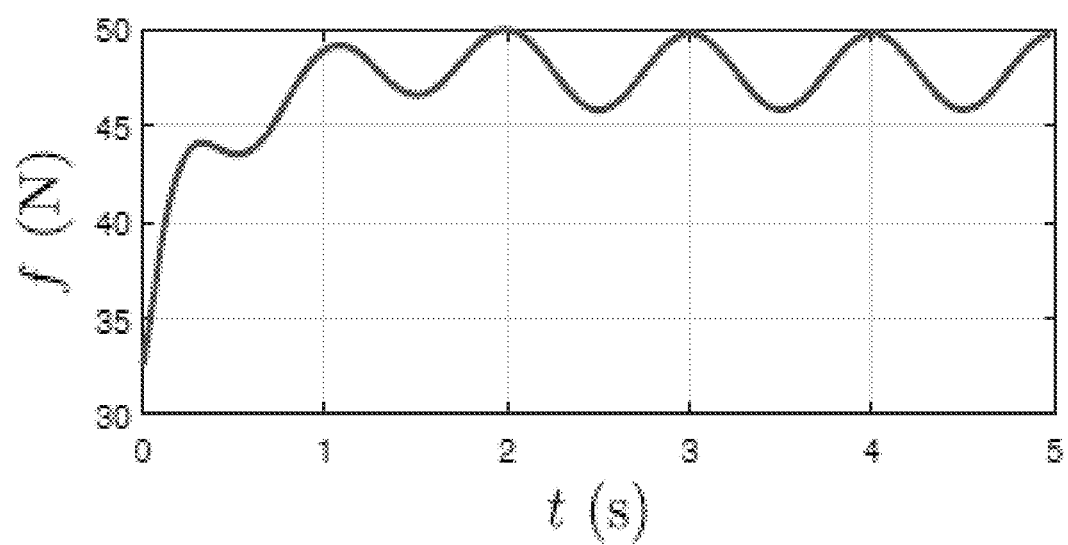
FIG. 9 is a graph of the magnitude of total thrust according to the present invention.
Figure 10:
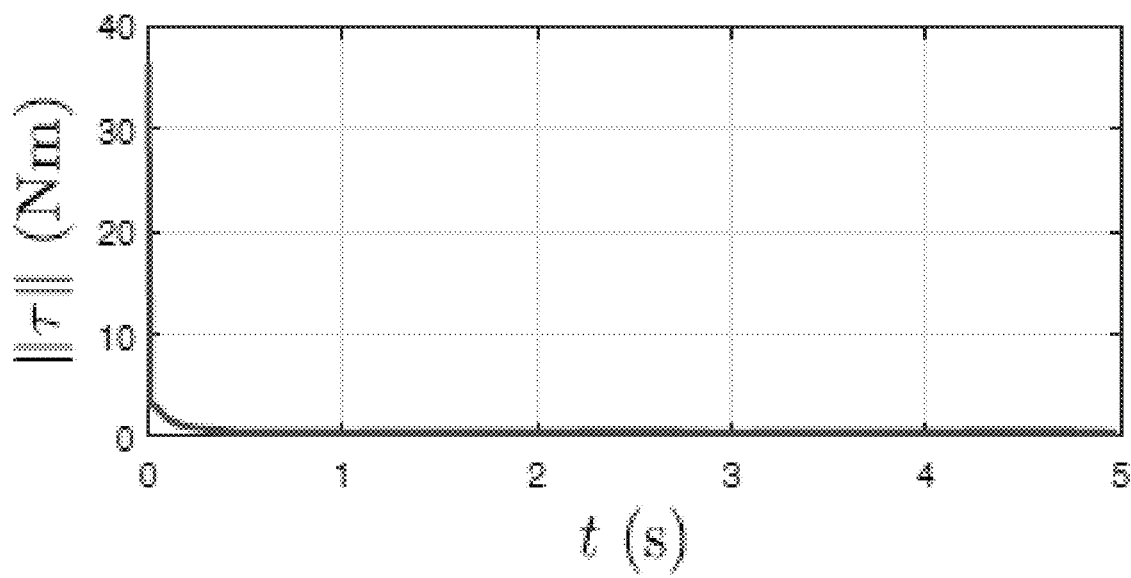
FIG. 10 is a graph of the control torque according to the present invention.

The time trajectory of the UAV tracking the desired trajectory is shown in FIG. 2 and it is inferred that the trajectory converges to the desired values in finite time and remains stable for all time, t>0. The attitude tracking error given by the principal angle, Φ converges in finite time which indicates that R tracks $R_d$ as shown in FIG. 3. The angular velocity error is plotted in FIG. 4, and it is shown to converge to a small bounded neighborhood of the origin. The position tracking error is shown in FIG. 5 and the velocity tracking error in FIG. 6. The tracking performance shows the errors converging to zero. Thus, the control scheme of the present invention tracks the position and remains stable even with the large initial position error with the norm of the position and velocity tracking errors shown in FIGS. 7 and 8. The total magnitude of the thrust force is less than 50 Newtons as shown in FIG. 9 and the corresponding control torque is shown in FIG. 10; these control inputs are reasonable and within the capabilities of the four propellers of the UAV as given by (53). From the simulation results, it can be inferred that the integrated guidance and control scheme takes the UAV from an initial pose to a desired final pose and the overall feedback system is stable.

Figure 11:
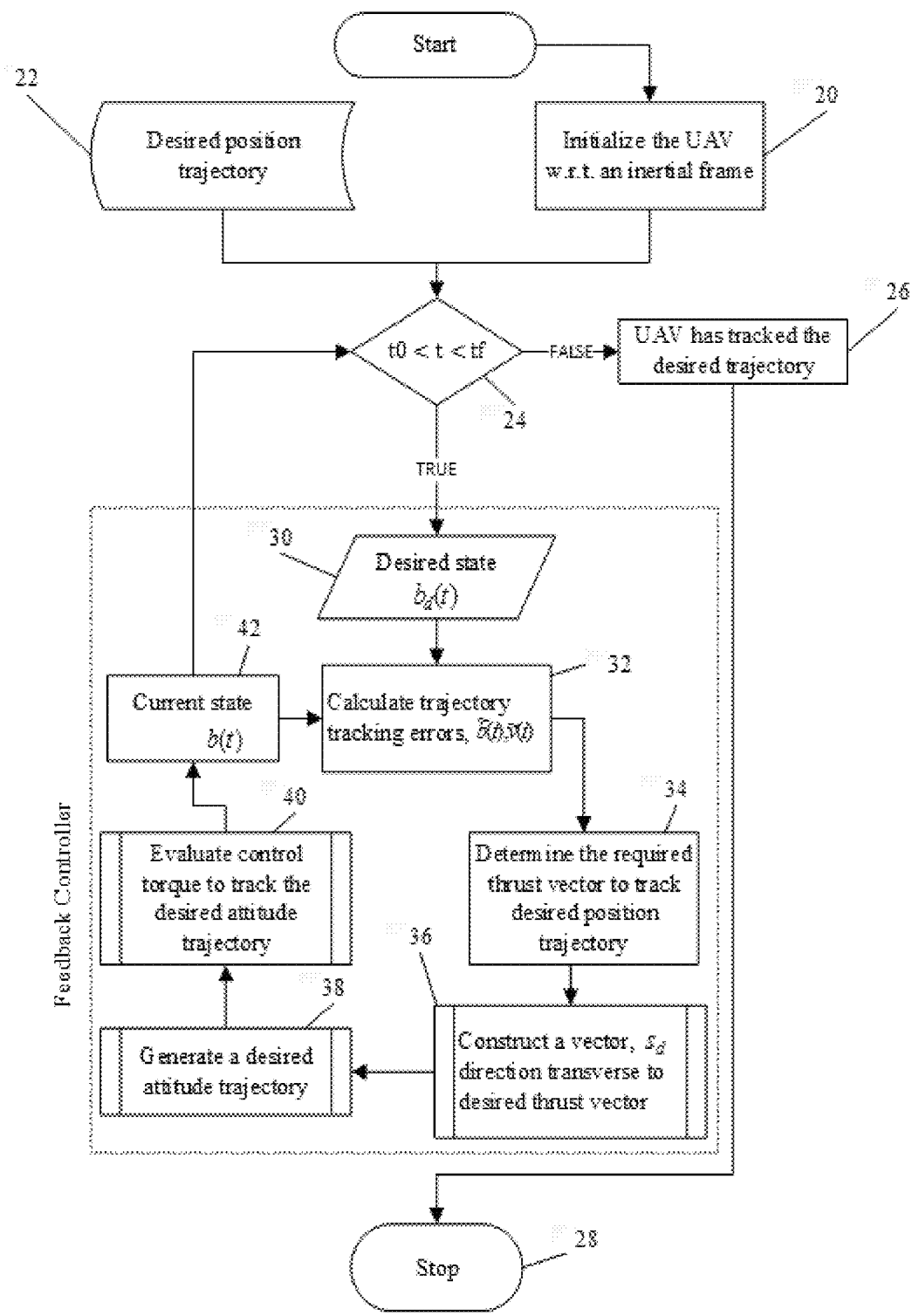
FIG. 11 is a flowchart of a control process for an underactuated vehicle according to the present invention.

Referring to FIG. 11, the present invention includes a method of controlling an underactuated vehicle 10 implemented on-board, such as in a microcontroller 16, that is provided with control over all thrusters 14. The flight control method commences with the initialization 20 of underactuated vehicle 10 with respect to an inertial frame. As discussed above, this involves using the appropriate paradigm for the particular underactuated vehicle representing its thrush and control characteristics. Next, a smooth position trajectory passing through the desired waypoints is loaded from an external database 22 for use initialized underactuated vehicle 10. At its simplest, the trajectory may be from a starting position to a final destination and include one or more waypoints that vehicle 10 must progress to prior to completing a flight. The determination of the best trajectory given a finite set of waypoint may be determined by conventional off-board systems and provided to vehicle 10. Alternatively, vehicle 10 could be programmed to determine a smooth position trajectory through the set of waypoints using conventional approaches implemented in the on-board microcontroller. Once the smooth position trajectory has been loaded, a check 24 is performed to determine whether time t is between a start time to and a finish time tr during which vehicle 10 must accomplish the desired trajectory. If check 24 is false, underactuated vehicle 10 has completed its flight by tracking the desired trajectory 26 and can stop 28. If check 24 determines that time t is between the start time to and the finish time tr, vehicle 10 determines the desired state 30. Next, trajectory tracking errors are calculated 32 and vehicle 10 determines the required thrust vector to track the desired position trajectory 34. From this information, a vector is constructed in a direction that is transverse to the desired thrust vector 36. Next, a desired attitude trajectory is generated 38. As explained above, the attitude trajectory is non-linearly stable and can therefore improve the efficiency of the flight control as well as the stability of vehicle 10 in adverse conditions. The control torque is then evaluated to track the desired attitude trajectory 40 and applied by vehicle 10. For example, the appropriate thrust is provided to the thrusters 14 of vehicle 10 as established in initialization step 20 so that vehicle 10 is flown along the trajectory provided in step 24 using the appropriate attitude trajectory. The current state of vehicle 10 is then determined 42 (i.e., current position, attitude, and body velocity of underactuated vehicle 10 are determined to monitor the progress of vehicle 10) and control returns to check 24. Location may be provided by a number of conventional processes, such as global positioning systems (GPS), WiFi location, or even external telemetry. The feedback control of FIG. 11 is repeated in discrete time until vehicle 10 is determined to have completed its route by check 24.

As described above, trajectory tracking control (both position and attitude), it is performed using geometric control that guarantees nonlinear (Lyapunov) stability. The stability of the overall control loop and convergence to the desired attitude and position trajectories is guaranteed by the finite-time stability of the attitude control scheme, which converges to the desired attitude (and direction transverse to the thrust direction) in finite time. The finite-time stable attitude control generates the desired thrust direction to track the given position trajectory. As this converges in finite time, the desired thrust direction is exactly followed after this convergence occurs. This ensures that the position trajectory converges to the desired position.

The present invention thus provides an integrated guidance and feedback control scheme for steering an underactuated vehicle through desired waypoints in three-dimensional space. The underactuated vehicle is modeled as a rigid body with four control inputs. These control inputs actuate the three degrees of freedom of rotational motion and one degree of freedom of translational motion in a vehicle body-fixed coordinate frame. This actuation model is appropriate for a wide range of underactuated vehicles, including spacecraft with internal attitude actuators, vertical take-off and landing (VTOL) aircraft, fixed-wing multirotor unmanned aerial vehicles (UAVs), maneuverable robotic vehicles, etc. The guidance problem is developed on the special Euclidean group of rigid body motions, SE(3), in the framework of geometric mechanics, which represents the vehicle dynamics globally on this configuration manifold. The integrated guidance and control algorithm selects the desired trajectory for the translational motion that passes through the given waypoints, and the desired trajectory for the attitude based on the desired thrust direction to achieve the translational motion trajectory. A feedback control law is then obtained to steer the underactuated vehicle towards the desired trajectories in translation and rotation. This integrated guidance and control scheme takes into account known bounds on control inputs and generates a trajectory that is continuous and at least twice differentiable, which can be implemented with continuous and bounded control inputs. In an example, the integrated guidance and feedback control scheme is applied to an underactuated quadcopter UAV to autonomously generate a trajectory through a series of given waypoints in SE(3) and track the desired trajectory in finite time. The overall stability analysis of the feedback system is addressed. Discrete time models for the dynamics and control schemes of the UAV are obtained in the form of Lie group variational integrators using the discrete Lagrange-d'Alembert principle. Almost global asymptotic stability of the feedback system over its state space is shown analytically and verified through numerical simulations.

The present invention thus provides a stable and robust system for the UAV to track three-dimensional position trajectory that: (i) generates a feedback control force along the UAV body-fixed thrust direction to track the desired position trajectory in 3D; (ii) ensures that the control force is within the thrust generation capabilities of the UAV; and (iii) has a control force that leads to convergence in finite time to the desired position trajectory. The present invention also provides a method for autonomously generating the desired attitude trajectory for UAVs that: (i) generates a trajectory for the required thrust direction along the third body axis to track the desired position trajectory; and (ii) generates the other two body-fixed coordinate axes orthogonal to the generated thrust direction. The present invention further provides a stable and robust attitude trajectory tracking control method that: (i) generates a three-axis control torque to track the three-dimensional attitude motion trajectory; (ii) provides a control torque that is within the torque generation capabilities of the UAV; and (iii) has a control torque that converges in finite time to the attitude trajectory faster than the control force converges to the position trajectory. The stable and robust position and attitude control schemes are discretized in time for embedded computer implementation such that they are stable and robust in discrete time.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A control system for an underactuated vehicle having a plurality of thrusters that provide a body-fixed thrust direction, comprising:
  a controller operably interconnected to the plurality of thrusters for selectively controlling each of the plurality of thrusters;
  wherein the controller is programmed to receive a starting position, at least one waypoint, and a final destination,
  to determine a smooth position trajectory that is continuous and at least twice differentiable for describing a flight path for the vehicle from the starting position through the at least one waypoint to the final designation,
  to determine a thrust vector that is continuous and differentiable and that converges to the smooth position trajectory in an asymptotically stable manner,
  to generate a unit vector that is continuous and differentiable and that is transverse to the thrust vector,
  to generate a smooth attitude trajectory from the thrust vector and the unit vector that is transverse to the thrust vector, and
  to generate a control torque that is continuous and tracks the smooth attitude trajectory and converges in finite time to the smooth attitude trajectory faster than the thrust vector converges to the position trajectory.

2. The control system of claim 1, wherein the controller is further programmed to selectively operate the plurality of thrusters of the vehicle according to the control thrust and control torque.

3. The control system of claim 2, wherein the controller is further programmed to determine a current position, an attitude, a translational velocity, and an angular velocity of the vehicle after operating the plurality of thrusters.

4. The control system of claim 3, wherein the controller is programmed to repeat the determination of the thrust vector, the unit vector that is transverse to the thrust vector, the attitude trajectory, the control torque, the operation of the thrusters, and the determination of the current position, attitude, translational velocity and angular velocity according to discrete time intervals.

5. The control system of claim 4, wherein the controller is programmed to determine the thrust vector that tracks the smooth position trajectory by geometric control that guarantees nonlinear stability.

6. The control system of claim 5, wherein the attitude trajectory is obtained from the smooth position trajectory using the desired thrust vector direction and the transverse direction.

7. The control system of claim 6, wherein the controller is programmed to determine a control torque for the vehicle that guarantees finite-time stable tracking of the generated attitude trajectory and then provides the thrust vector that tracks the received smooth position trajectory.

8. The control system of claim 1, wherein the smooth position trajectory is determined by the continuous and twice differentiable time trajectory by using an interpolating function between the starting position, the at least one waypoint, and the final destination.

9. The control system of claim 1, wherein the smooth position trajectory is determined by a time trajectory generated using an optimal linear quadratic control scheme.

10. A method of controlling an underactuated vehicle having a plurality of thrusters, comprising:
  receiving a starting position, at least one waypoint, and a final destination;
  using a controller positioned on the vehicle to determine a smooth position trajectory that is continuous and at least twice differentiable, wherein the smooth position trajectory describes a flight path for the vehicle from the starting position through the at least one waypoint to the final destination;
  using the controller positioned on the vehicle and operably interconnected to the plurality of thrusters to generate a thrust vector that is continuous and differentiable and that converges to the smooth position trajectory in an asymptotically stable manner;

using the controller on the vehicle to generate a unit vector continuous and differentiable and that is transverse to the thrust vector;

using the controller on the vehicle to generate a smooth attitude trajectory from the thrust vector and the unit vector;

using the controller on the vehicle to generate a control torque for the vehicle that converges to the smooth attitude trajectory in a finite-time and stable manner faster than the thrust vector converges to the position trajectory.

11. The method of claim 10, further comprising the step of using the controller to selectively operate the plurality of thrusters of the vehicle according to the control torque.

12. The method of claim 11, further comprising the step of determining a current position, an attitude, and a velocity of the vehicle after operating the thrusters.

13. The method of claim 12, further comprising the step of repeating the determination of the thrust vector, the unit vector that is transverse to the thrust vector, the attitude trajectory, the control torque, the operation of the thrusters, and the determination of the current position, attitude, and velocity according to discrete time intervals.

14. The method of claim 13, wherein the step of determining the thrust vector that tracks the smooth position trajectory is performed by geometric control that guarantees nonlinear asymptotic stability.

15. The method of claim 14, wherein the step of determining the attitude trajectory to track the received smooth position trajectory is performed by geometric control that guarantees nonlinear finite-time stability.

16. The method of claim 15, wherein the step of determining the control torque for the vehicle that provides the thrust vector and the attitude trajectory that tracks the smooth position trajectory is performed by finite-time stable attitude control.

* * * * *